O. W. BROWN.
WELDING STAND.
APPLICATION FILED AUG. 16, 1918.
1,313,061.
Patented Aug. 12, 1919.
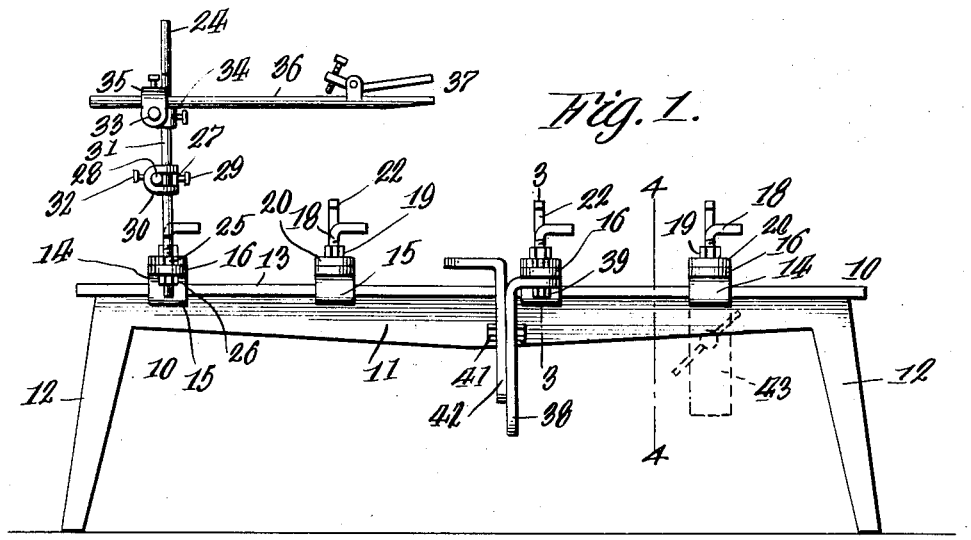
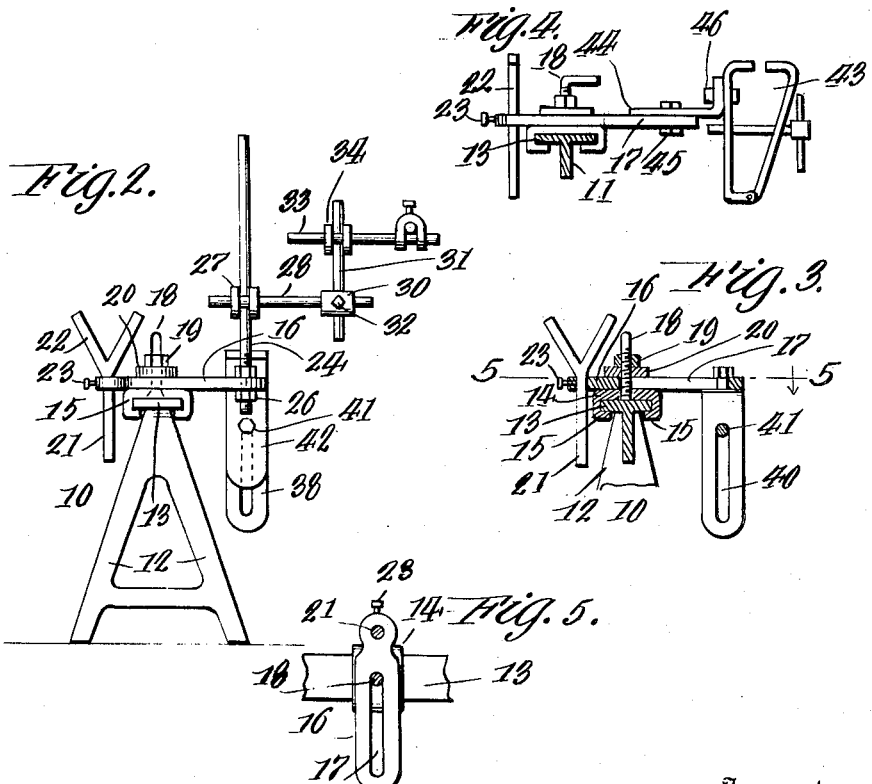
Witnesses
Guy M. Spring
H. P. Hollingsworth
Inventor
Oscar Wilson Brown
By Richard B. Owen.
Attorney

UNITED STATES PATENT OFFICE.

OSCAR WILSON BROWN, OF ABILENE, KANSAS.

WELDING-STAND.

1,313,061.   Specification of Letters Patent.   Patented Aug. 12, 1919.

Application filed August 16, 1918. Serial No. 250,192.

*To all whom it may concern:*

Be it known that I, OSCAR WILSON BROWN, a citizen of the United States, residing at Abilene, in the county of Dickinson and State of Kansas, have invented certain new and useful Improvements in Welding-Stands, of which the following is a specification.

This invention relates to a welding stand or jig and has for its object to provide a simple, convenient and handy tool for the use of metal workers whereby articles to be welded whether large or small, may be securely and firmly supported in proper contact and so held during the operation of welding.

A further object of the invention is to provide a welding stand for the purpose set forth with holding or supporting means for the articles to be welded which means are readily and conveniently adjustable either vertically, horizontally, or in any angular direction desired to place the object to be operated upon in the most convenient position for the operator.

With these objects in view, together with others which will appear as the description proceeds, the invention resides in the novel formation, combination and arrangement of parts, all as will be described more fully hereinafter, particularly pointed out in the claims, and illustrated in the accompanying drawings, in which:

Figure 1 is a side elevation of the welding stand complete.

Fig. 2 is an end elevation as seen from the left of Fig. 1.

Fig. 3 is a cross sectional view through the stand on the line 3—3 of Fig. 1.

Fig. 4 is a sectional view on the line 4—4 of Fig. 1.

Fig. 5 is a horizontal sectional view on the line 5—5 of Fig. 3.

In the drawings, 10 indicates the base of the welding stand, formed in the present instance of a T-shaped horizontal beam 11 of such length as may be desired and upheld at each end by legs 12 which rest upon the ground. Slidable endwise upon the head 13 of the beam 11 are a plurality of transversely disposed blocks 14, the ends of which are turned downwardly and inwardly as at 15 to engage under the head 13 of the beam 11. Supported on each of the blocks 14 is an elongated plate 16 through which is formed a longitudinal slot 17 for the passage therethrough of a tail screw 18 which extends downwardly through said slot and is threaded into the block 14, its lower end bearing on the top of the base head 13 to raise said block and cause the hooks 15 to engage the underside of said head and frictionally secure the block against movement thereon. When the screws are loosened, the blocks can be slid freely endwise on the base 10. The plate 16 on each block 14 may be locked in any position of adjustment transversely, longitudinally or angularly of the base in a horizontal plane by a nut 19 threaded on the tail screw 18 and a washer 20 between the nut and the plate 16. One end of each plate 16 is provided with a vertical perforation within which is slidably mounted the shank 21 of a V-shaped fork 22, these several forks forming a support for carrying a rod, pipe or other elongated article to be welded. The vertical positions of the forks 22 and their angular positions about the axis of their shanks 21 are controlled by set screws 23 threaded into the ends of the plates 16 and bearing upon the bars 21. Another means for supporting articles is perhaps best seen in Fig. 2.

Extending vertically through the slot 17 in one of the plates 16 is the lower end of a rod 24, said end being threaded for nuts 25 and 26 that bear respectively upon the upper and lower faces of the plate 16 and hold the rod 24 rigidly in vertical position and immovable within the slot. The rod 24 extends to any desired height and carries one or more U-shaped clips 27, the curved portion of said clip hugging the rod 24 while through the ends are formed perforations to receive a horizontal rod 28. The positions of the rods 24 and 28 are determined relatively to each other and to the clip 27 by sliding them endwise in and through the clip and after the proper position has been determined, they are fastened against movement and rigidly in position by a bolt 29 threaded into the curved portion of the clip and bearing at its end against the vertical rod 24, the pressure of the bolt on said rod causing the clip to move endwise and press the horizontal rod 28 against the rod 24. A similar clip 30 is mounted to slide upon and rotate about the rod 28 and support a short vertical rod 31, these two rods being held to the clip by a bolt 32. Similarly a short horizontal rod 33 is carried by a clip 34 on the vertical rod 31 and finally a clip 35 connects one arm 36 of tongs 37 to the rod 33. It is evident that through the connection just described, which supports the tongs 37, any article held by said tongs may be adjusted into any suitable position within the limits of the machine, it being only necessary to move the rods longitudinally with relation to each other or rock them in their several supporting clips.

Another means for supporting an article to be welded comprises an angle plate 38, one arm of which extends below or above one of the plates 16 and is secured thereto by a bolt 39 passing through said arm and the slot 17 in the plate 16. The vertically depending arm of the angle plate 38 is longitudinally slotted as at 40 for the passage therethrough of a bolt 41 which secures an angular foot piece 42 to the angle plate, said foot piece, by means of the bolt 41 and slot 40 and the fastening bolt 39 of the angle plate being readily adjustable when it is desired to raise, lower or tilt the same or move it to and from the base 10 of the machine.

Another feature forming a part of this machine is a vise 43 of any approved type which is secured to a foot piece 44 fastened by a bolt 45 to one of the horizontal plates 16, the bolt 45 passing through the longitudinal slot 17 in said plate and thus provides means for adjusting the position of the vise.

A machine constructed as described provides in a compact form means for supporting and holding innumerable articles to be welded, the universal adjustment of the supporting means enabling these articles to be accurately placed in relation to each other and held in position during the operation of welding. Articles which are sufficiently heavy to be self sustaining, can be supported directly upon the plates 16, which may be moved by collection or distribution to any desired relative position upon the base 10, so as to suit the size or shape of the article to be supported. In connection with these plates, the foot plate 42 will under certain conditions, be most convenient. The vise 43 may be attached to any one of the plates 16 and may be swung horizontally about the bolt 45 or vertically about the bolt 46 which connects the vise to the foot piece 44, the vise being capable of turning in a complete circle about the latter bolt and thus a practically universal adjustment is provided for the vise. The tongs 37 can be used alone or in connection with the vise or with an article resting upon either of the plates 17 and through its unlimited adjustment, an article held by said tongs can be brought into proper relation to another article otherwise supported. A further attachment and not the least provided by this machine are the V-shaped forks 22 which form convenient, ready and efficient means by which shafting and pipe, either straight or curved, can be quickly alined for welding.

The foregoing description and the drawings have reference to what may be considered the preferred, or approved form of my invention. It is to be understood that I may make such changes in construction, combination and arrangement of parts, materials, dimensions, et cetera, as may prove expedient and fall within the scope of the appended claims.

Having thus fully described my invention, what I claim as new and desire to secure by Letters Patent, is:

1. A welding stand comprising a horizontally supported base, and a plurality of work holding devices individually slidable in a longitudinal direction on said base and individually adjustable transversely and vertically with relation to said base.

2. A welding stand comprising a horizontally supported base, a plurality of work holding devices individually slidable in a longitudinal direction on said base and adjustable in relation to one another, and means for fastening each of said devices to the base in adjusted position.

3. A welding stand comprising a horizontally supported base, blocks individually slidable longitudinally on said base, means on each block for locking it to the base, and work holding devices carried by two or more of said blocks and adjustable in two directions.

4. A welding stand comprising a horizontally supported base, blocks individually slidable on said base, a locking screw threaded in each of said blocks to lock the same to said base, said locking screw extending vertically of the block, a slotted plate slidable on each of said blocks and horizontally rotatable about said locking screw, nuts on said locking screws for fastening said plates rigidly on the blocks, and a work holder carried by one of said plates and adjustable thereon.

5. A welding stand comprising a horizontal base formed of a T-shaped beam supported on legs, a plurality of blocks individually slidable longitudinally on the head of said beam, the ends of said blocks being turned downwardly and under said head to engage the same, a locking screw threaded vertically into each block and adapted to bear upon the head of the beam to hold the block on the base, a slotted plate movable on each block and adapted to swing about said locking screw which passes through the slot in the plate, a nut on each locking screw for clamping the plate to the block, a standard adapted to pass through the slot in any one of said plates and having means thereon for securing it rigidly to the plate, and a work holder supported by said standard.

6. A welding stand comprising a horizontally supported base, blocks individually slidable longitudinally on said base, means on each block for locking it to the base, a slotted plate slidable longitudinally on each of said blocks and rotatable about the block locking means, a nut on each locking means for holding a plate on a block, and supports carried by said plates, said supports being adjustable vertically and rotatable about their vertical axes.

In testimony whereof I affix my signature in presence of two witnesses.

OSCAR WILSON BROWN.

Witnesses:
S. S. SMITH,
C. E. RUGLE.